US006697500B2

(12) United States Patent
Woolston et al.

(10) Patent No.: US 6,697,500 B2
(45) Date of Patent: Feb. 24, 2004

(54) METHOD AND SYSTEM FOR MAIL DETECTION AND TRACKING OF CATEGORIZED MAIL PIECES

(75) Inventors: Mark Woolston, Copper Canyon, TX (US); Boris Kogan, Dallas, TX (US); Leon H. Bourek, Richardson, TX (US)

(73) Assignee: Bowe Bell + Howell Postal Systems Company, Lincolnwood, IL (US)

( * ) Notice: Subject to any disclaimer, the term of this patent is extended or adjusted under 35 U.S.C. 154(b) by 0 days.

(21) Appl. No.: 10/095,306

(22) Filed: Mar. 11, 2002

(65) Prior Publication Data

US 2003/0169900 A1 Sep. 11, 2003

(51) Int. Cl.$^{7}$ .................................................. G06K 9/00
(52) U.S. Cl. ....................................................... 382/101
(58) Field of Search ................................. 382/101, 102; 209/584, 900; 705/406, 410, 411

(56) References Cited

U.S. PATENT DOCUMENTS

| | | | | | |
|---|---|---|---|---|---|
| 6,064,995 | A | * | 5/2000 | Sansone et al. | 705/410 |
| 6,360,001 | B1 | * | 3/2002 | Berger et al. | 382/101 |
| 6,427,021 | B1 | * | 7/2002 | Fischer et al. | 382/101 |
| 6,567,008 | B1 | * | 5/2003 | Sansone | 340/666 |
| 2002/0141613 | A1 | * | 10/2002 | Sansone | 382/101 |
| 2003/0121839 | A1 | * | 7/2003 | Ryan, Jr. et al. | 509/589 |

* cited by examiner

*Primary Examiner*—Andrew W. Johns
(74) *Attorney, Agent, or Firm*—Patula & Associates, P.C.

(57) ABSTRACT

A system for detection and tracking of mail pieces containing certain characteristics within the postal system and other commercial handlers of mail pieces. The present invention will detect mail pieces, which meet certain criteria, and track the mail through the system. The present invention accomplishes this detection and evaluation of mail pieces by the use of cameras and computer technology, and using this technology to identify characteristics of mail pieces that are scanned and recorded for analysis.

19 Claims, 5 Drawing Sheets

METHOD AND SYSTEM FOR MAIL DETECTION AND TRACKING OF CATEGORIZED MAIL PIECES

The present invention relates generally to the field of processing mail, and in particular to a method and system for the detection and tracking of categorized mail pieces to help improve the security of mail in the postal environment. More specifically, the present invention relates to the evaluation, detection and tracking of mail pieces received by postal agencies and by other commercial handlers or carriers of mail pieces. The present invention accomplishes this evaluation and tracking of categorized mail pieces through the use of a mail piece image capture and storage system, and an image recognition system.

BACKGROUND OF THE INVENTION

Mail processing centers continually receive, process and deliver billions of pieces of mail, for example letters, bills, advertisements, packages, etc. To do this in an efficient and timely manner, the mail processing industry employs a large number of individuals, and countless machines for the processing of mail. When the mail is collected, it is brought to a processing center, where it is sorted and segregated from other mail based on categories such as weight, class of mail, and ZIP code direction.

Clerks, known as distribution clerks, sort local mail for delivery to individual customers. A growing proportion of distribution clerks are known as mail processors and operate optical character readers (OCRs) and bar code sorters to arrange mail according to destination. OCRs "read" the ZIP code and spray a bar code onto the mail. Bar code sorters then scan the code and sort the mail. Because this is significantly faster than older sorting methods, it is becoming the standard sorting technology in mail processing centers.

Nevertheless, a number of distribution clerks still operate old electronic letter-sorting machines in some locations. These clerks push keys corresponding to the ZIP code of the local post office to which each letter will be delivered. Still other clerks sort odd-sized letters, magazines, and newspapers by hand. In small facilities, some clerks perform all of the functions listed above. Once clerks and OCR's have processed and sorted the mail, it is ready to be delivered.

The problem exists that the current OCR's and distribution clerks do not have the capability to determine whether each mail piece contains "watch" characteristics. The problem further exists that the mail distribution clerks do not have the knowledge, information or time to determine whether a mail piece contains "watch" characteristics and should be segregated from other mail and more closely scrutinized before delivery.

Yet another problem is that there is no system in place for the process of specifying and detecting "watch" characteristics of mail pieces so they can be traced throughout the mail system. Therefore, it would be nearly impossible to expel a mail piece after it has been initially screened for "watch" characteristics.

The present invention overcomes these limitations by, for example, allowing for each piece of mail that goes out from the postal center to be scanned, identified and evaluated before it is allowed to leave the postal distribution center. The present invention further overcomes these limitations by using image recordation that allows for later characteristic detection, retrieval, and subsequent evaluation. Further, the present invention allows for the image capture and storage of each and every mail piece for a period of time, such that the later evaluation does not have to be undertaken in short periods of time. The present invention addresses the disadvantages and/or shortcomings of known prior art method and systems for mail processing and provides significant improvements there over.

OBJECTS OF THE INVENTION

The present invention addresses a method and system for screening mail that is brought into mail processing centers, and evaluating this incoming mail for certain mail piece characteristics and/or inconsistencies in the mail pieces. The present invention comprises a mail piece image capture and storage system, and an image recognition system to determine if certain "watch" characteristics exist, and if so, to flag them for potential special handling.

Accordingly, an object of the present invention is to provide a process and system for monitoring mail pieces and detecting "watch" characteristics in mail pieces before they can be released for delivery.

Yet another object of the present invention is to achieve the above-mentioned object by subjecting mail pieces to an image recordation system to record specified characteristics of mail pieces.

Yet another object of the present invention is to achieve the above-mentioned object by comparing the stored image information with information or rules from a database to determine whether a mail piece should be flagged as matching the information or rules from the database.

Another object of the present invention is to provide a mechanism to identify and tag each piece of mail as it is being transitioned for outgoing mail.

Yet another object of the present invention is to provide a mechanism, which will capture images of each outgoing piece of mail that passes through a mailing center.

Another object of the present invention is to provide a process for storing and evaluating the information from the scan of each mail piece that passes in front of the image capture system.

Yet another object of the present invention is to provide a mechanism whereby the stored information of each mail piece can be retrieved at a later date or time for further inspection and evaluation.

Another object of the present invention is to provide a central processing site for the image system such that the information contained therein can be easily retrieved and maintained.

Another object of the present invention is to provide a monitoring system to detect organizations, names, address signatures, mail format signatures, etc., that are contained in the watch list.

Numerous other objects, features and advantages of the present invention will become readily apparent through the detailed description of the preferred embodiment, the drawings and the claims.

SUMMARY OF THE INVENTION

The present invention relates generally to the detection and tracking of "watch" mail pieces from the postal system or other commercial handlers of mail pieces. More specifically, the present invention relates to the processing of mail in such a manner so as to detect "watch" mail pieces, and to evaluate and track the mail through the postal system. The present invention accomplishes this detection and evaluation of "watch" mail pieces through the use of an image capture system and an image recognition system.

The present invention allows a mail center operator to screen outgoing and incoming mail to detect certain characteristics in mail forms, and for detection of these characteristics of mail pieces before they are released for delivery. The preferred embodiment of the present invention uses an image capture device such as a camera system that is used as the invention's "eyes" to detect "watch" mail. The camera system generates a specific identification code or tag for each piece of mail that is passed in front of it. As each piece of mail is passed in front of the camera, the camera captures and stores the information of each mail piece in a database.

This information can be sent to various locations for further analysis and processing, such as comparison or cross-reference to various databases. The kind of information that is identified, stored, and evaluated includes existing address recognition, fictional return addresses, firm names or logos in return address, individual names in return address, mail recipient names and addresses, machine or handprint address flags, and mail piece formation features, among many others. This greatly improves the efficiency and durability of the system to detect and track "watch" mail before it is released from the processing center. The camera system employs Address Recognition and other pattern use recognition techniques to record additional features of the mail in the recorded database. These features can then be queried to detect "watch" characteristics. For example, the present invention can locate, read and record each return address to determine if it is valid. It can perform name recognition functions on mail recipients. It can extract feature signature codes from the addresses and produce mail formation signatures. It can interpret pre-defined "watch" rules and flag items that meet the rules, for human examination, or directly signal an alarm. The TAG and Scheme information can be employed to physically locate the mail piece.

The database recognition system serves as a collection point for all the information that is collected from the mail pieces that are passed in front of the camera. This database can then be queried via known database languages. Images that meet certain minimum threshold requirements can be routed to different locations for additional analysis.

The database is connected to the camera system and to postal sorting scheme information, flagging rules and updated "Watch" databases for each mail processing machine with which the present invention may be associated. The scheme information is employed to track the physical location of each mail piece that is scanned and analyzed.

The present invention also performs a variety of additional analysis on each image to produce clues that can be associated with the image. Processing takes place in real time and can be scaled to keep up with the mail volume that might be necessary in any given postal facility. Further, the present invention can interpret the database rules set to determine if the clues should cause warning flags to be set in the database system. The postal service or commercial agency employing the present system will download the criteria, which are to be used as warning tools to set off warning flags. Some of the criteria which can be scrutinized to warn of "watch" mail include return address location and reading, recipient name reading, indicia recognition, logo recognition, recipient address formation, mail piece formation features, machine or handprint address flags, and many others.

The present invention's database can interface with one or more graphology analyzers to determine mail piece signatures. Every address and every mail piece image can be reduced to a set of signature features that described the address and piece formation. These features are used by the system to determine whether the address or mail piece formation match any signatures in a watch list. The database system of the present invention records recorded images in compressed binary codes. The TAG, image address and all clues obtained from the image are recorded into the database. To limit the number of images stored, the system can be configured so that only images that have clues that meet the minimum "Watch" threshold will be recorded.

Further, once "watch" mail has been detected, the mail can then be routed though various different procedures for special processing.

DESCRIPTION OF THE DRAWINGS

A preferred embodiment of the present invention is described herein with reference to the drawing wherein.

DETAILED DESCRIPTION OF THE PREFERRED EMBODIMENT

While the invention is susceptible of embodiment in many different forms, there will be described herein in detail, preferred and alternate embodiments of the present invention. It should be understood, however, that the present disclosure is to be considered an exemplification of the principles of the invention and is not intended to limit the spirit and scope of the invention and/or claims of the embodiments illustrated.

Figure 1:
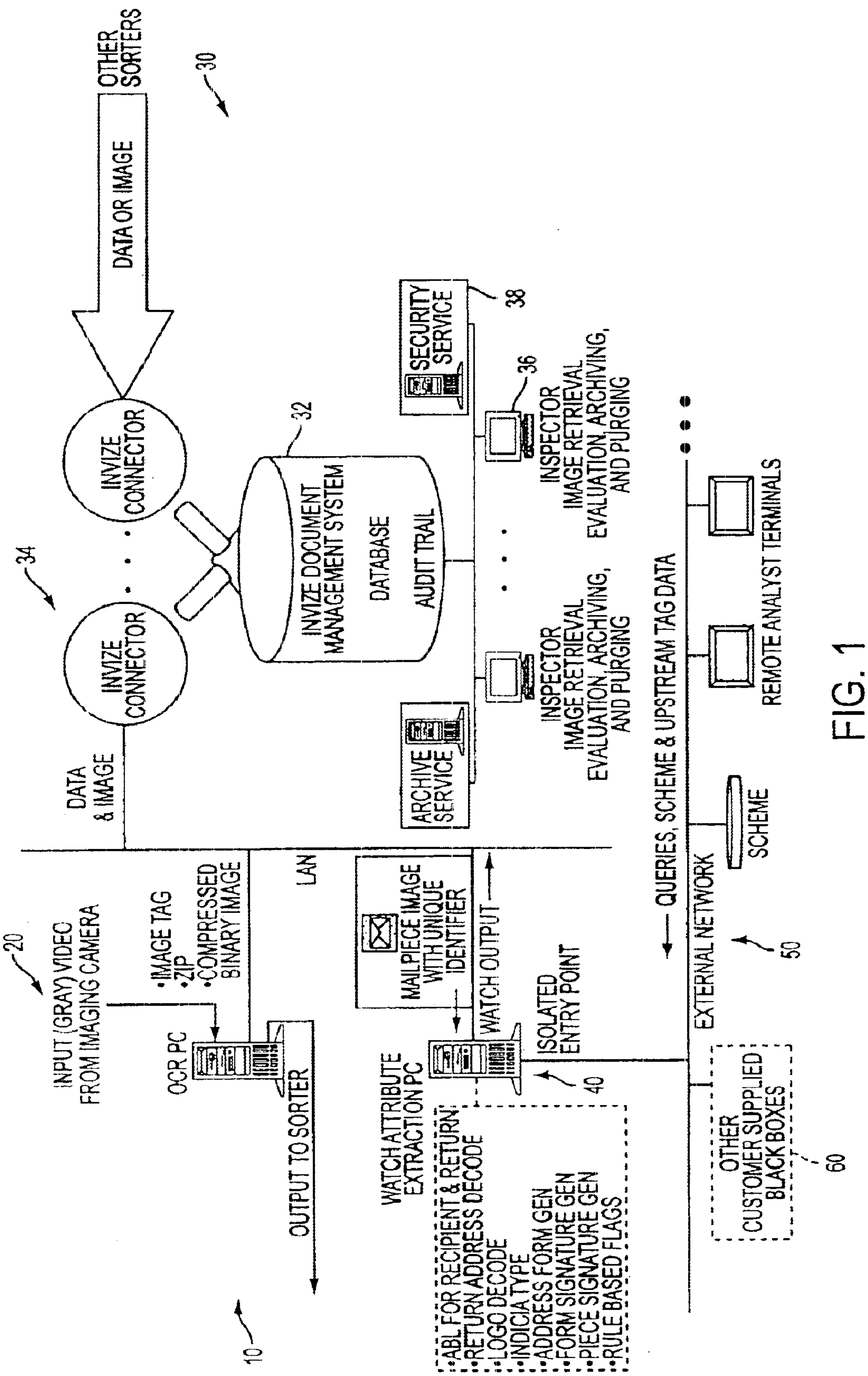
FIG. 1 is a schematic diagram of the overall system of the present invention.

As illustrated in FIG. 1, the preferred embodiment of the present invention 10 comprises three main elements; an image capture system 20, an image warehouse or database system 30, and an image attribute extraction or evaluation system 40. The image capture system 20, comprising generally a camera and a computer system, captures the information appearing on each mail piece and sends the image to the database system 30. The evaluation system 40 processes or "mines" the images that are stored in the database system 30 for various attributes. Images and attributes are sent via a LAN that operatively connects the legacy mail transport system, the camera system 20, the attribute extraction system 40, and the database system. The speed of the LAN must be sufficient to handle the image and data traffic.

The primary purpose of the image database system 30 is to store images, for a defined time period (for example, five days), of all or selected mail pieces that are processed by the user. Images are stored for a desired period of time that allows for later retrieval, threat detection, analysis and subsequent investigation. The image database 30 is built on open systems and a scalable architecture that leverages the mass storage systems that are commercially available.

The mail piece image, coupled with image "header" file information created by the image capture system 20, provides the user with subsequent audit and "Alert" capabilities unknown in the prior art. The open architecture allows for character, pattern and other algorithmic-based recognition processes from multiple vendors to process image data. Various processes are contemplated by the present invention including return address processing, targeted "Name" recognition and font-style recognition. The image database system 30 can be centrally located (i.e., at each processing site or even at the Remote Encoding Sites with the appropriate user's internal network changes) to allow for rapid deployment and ease of support/maintenance. The present invention can "mine" the image data in near real-time to provide immediate detection or other operational benefits, or can process image data at a later time (i.e. several days later). Additionally, the user can use the image data for other operational benefits such as detecting mis-sorts.

The process begins with the attribute extraction system 40 delivering compressed images and attribute data to the database 32 of system 30 and its management software 34. The database management software 34 allows networked applications to share data and images with the database system 30. This software auto-indexes images using the TAGs and attribute data supplied by the attribute extraction system 40. Auto-indexing eliminates the need for human intervention during the filing process. Known software can auto-index one hundred images (150 k average sized image) per second on a single 2 GHz processor with 256 MB RAM. This throughput speed allows multiple transport systems to feed a single database system 30 at each processing center. It is contemplated, however, that any suitable software and hardware configurations can be used.

Once the image is stored electronically in the system 30, inspectors retrieve images from the management software 34 using the attributes of each image. An intuitive retrieval interface 36 is presented to the inspectors for quick access to the desired image. Image filtering can be accomplished simply by searching attribute data within the management software. If the attribute data is not known, the user can invoke a quick or "wildcard" search. Mail items that require further review can be filed in "special" folders for long-term storage, while other non-"watch" mail items can be purged from the system. Images can be published to a CD or exported electronically.

The user controls permission to access images within the system 30 via a security component 38. The user can dictate who can view images, export images, delete images, re-index images and perform all other major functions within system 30 through the security service 38. If individuals do not have rights to perform specific tasks within the system 38, the icons for such functions will not be presented to that user.

Figure 2:
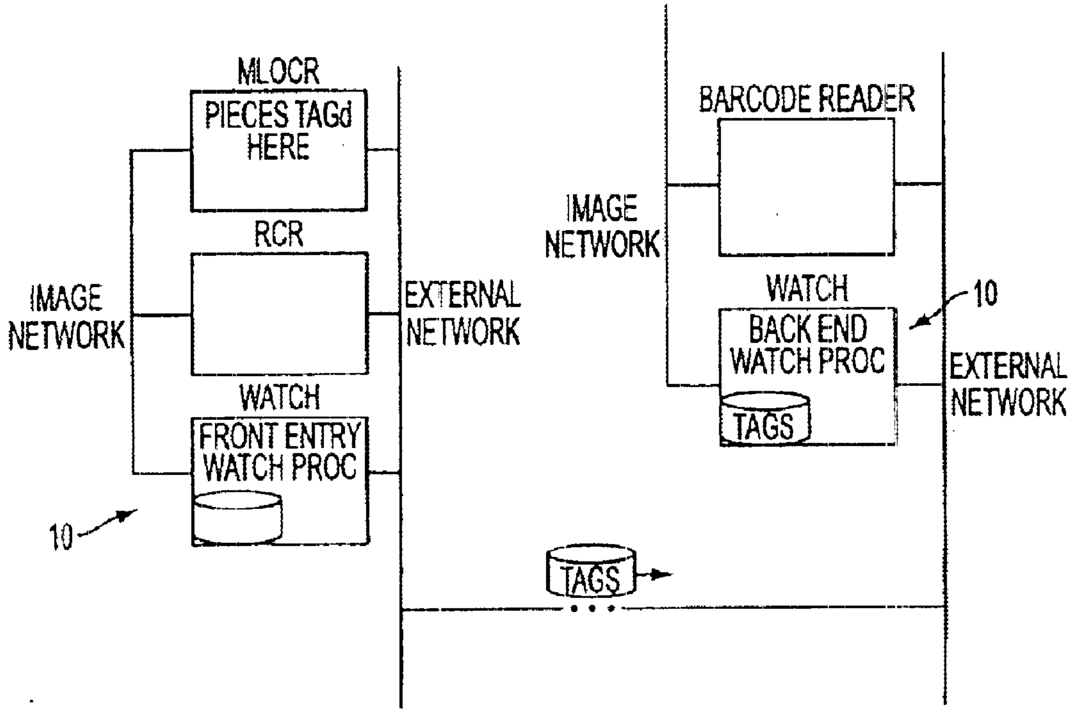
FIG. 2 is a schematic diagram of the present invention interfaced with existing networks.

As illustrated in FIG. 2, the present invention 10 can be deployed throughout the mail processing market and placed on all mail handling equipment containing image cameras. In the case of the USPS, MLOCR systems already TAG mail pieces and can send bi-tonal images to RIP and RCR for additional processing. These images can also be routed to the present invention 10 for special processing that extracts specific mail characteristics that can help identify, find and track suspicious mail pieces.

The present invention can interface with the existing networks. These networks can be utilized to coordinate between upstream mail processing e.g., MLOCR and downstream processing e.g., Barcode Sorter. This makes it possible to intercept physical pieces in transit on MLOCR's and/or Barcode Sorters.

Figure 3:
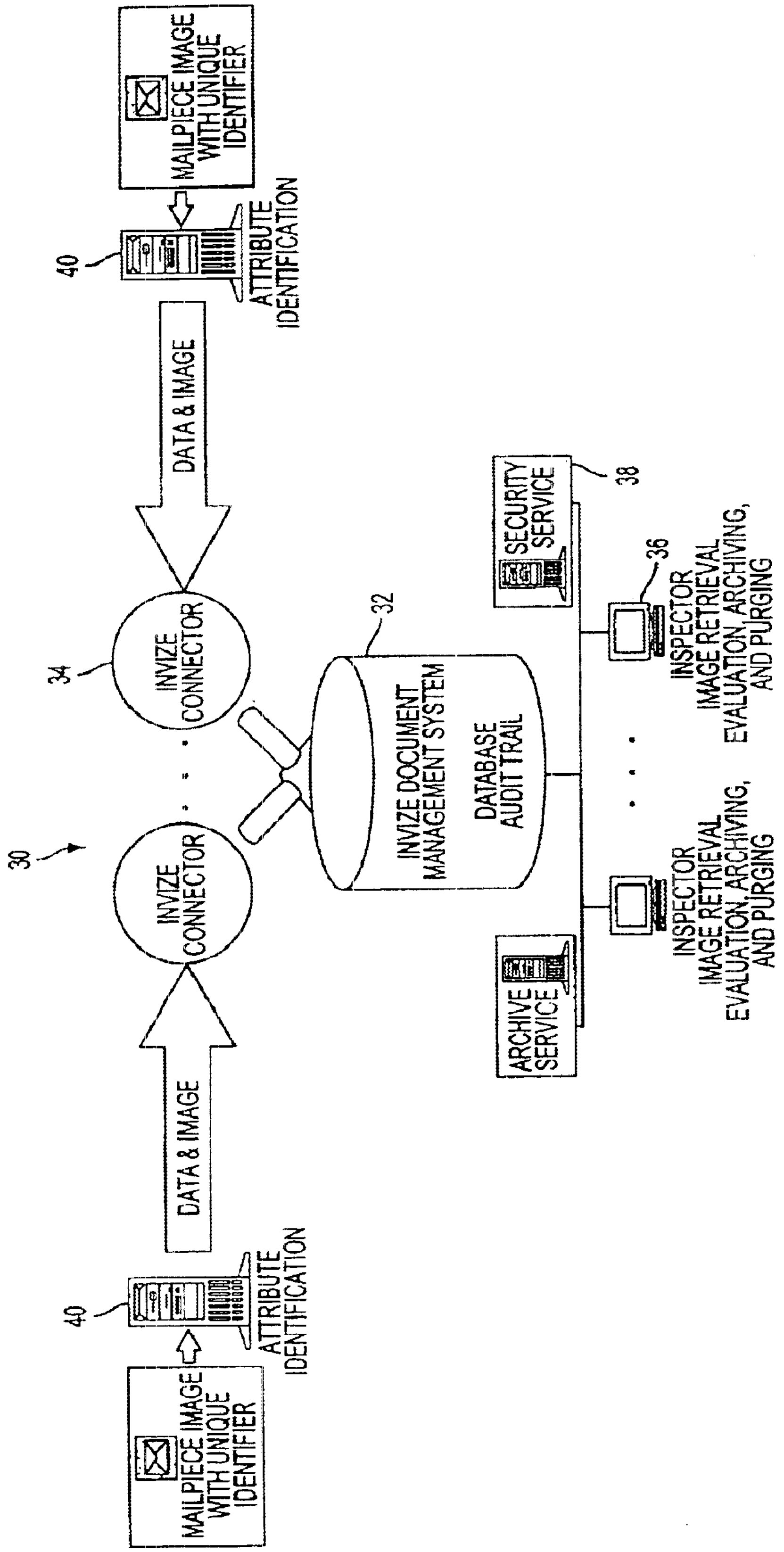
FIG. 3 is a schematic diagram of the database management system of the present invention.

FIG. 3 illustrates the database system 30 of the present invention. Database system 30 serves as a collection point for the images and all information known about the pieces, including any TAG or other information about the mail pieces generated by the evaluation system 40. The database system 30, comprising hardware 32 and management software 34, can be queried via normal database languages such as SQL. Images that meet certain minimum threshold requirements with respect to "watch" characteristics, as determined by the evaluation system 40 of the present invention, can be routed to inspector "Black Boxes" systems 36 for additional analysis. High threshold images can be routed via the local area network to a human analyst for final analysis and decisions about intercepting a mail piece.

The image database management software 34 can be any suitable, commercially available database management software, such as for example inVize™ which is a COTS product and readily available. Through inVize™, mail piece images are recorded as compressed binary. The TAG, image address and all characteristics obtained from the image are recorded in the database. While all images can be stored, it may not be desirable to do so. For example, to limit the number of images stored, only images that have attributes that meet the minimum "watch" threshold need be recorded. It is anticipated that no more than 10% of mail within a facility would be of interest.

The database management software of the present invention, such as inVize™, acquires, stores and provides electronic access to a virtually unlimited number of enterprise documents. Working seamlessly with the evaluation system 40, the database management software 34 can be used to store "watch" mail items for later review by the inspectors.

Figure 4:
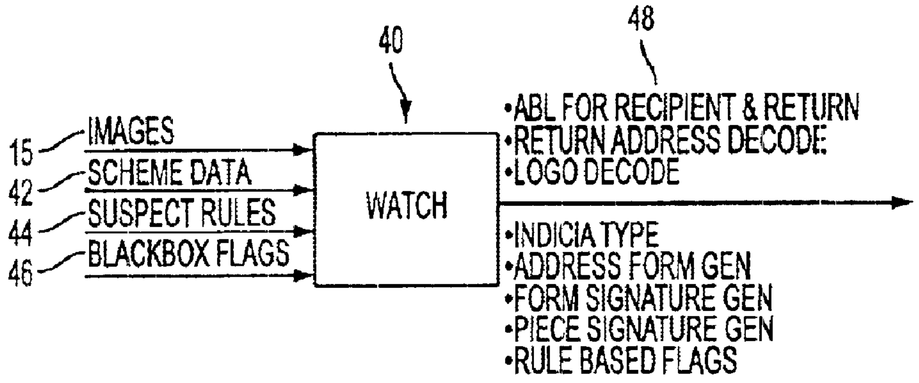
FIG. 4 is a schematic diagram of the image evaluation system of the present invention.

FIG. 4 is a schematic diagram of the attribute extraction or evaluation system 40 of the present invention. System 40 is a computer system, comprising hardware and software, which has the ability to translate the image of a mail piece into attributes that constitute a set of characteristics that can be analyzed against a set of pre-selected rules 44 and blackbox flags 46.

The "watch" rules 44 are a set of rules entered by the inspector or similar personnel and interpreted by the system 40. "Watch" rules 44 describe image and address attributes to watch for. If an image contains the requisite attributes, the mail piece producing the image and the attributes are flagged.

These rules can change over time. Thus, different images can be determined to be flagged depending on the specific set of rules in use at the time. For instance, one day the system may be looking for mail from a certain return address, and the next day the system may be looking for mail with block lettering in the destination address and a certain mail piece size.

A "blackbox" system 60 is a closed system attached to the LAN, specifically used to avoid any proprietary issues. The "blackbox" executes proprietary algorithms that analyze the image and output codes. The blackbox "flags" 46 are codes that are output by the blackbox 60. The flags 46 can be recorded in the database 32 along with other attributes about the mail piece. They can also be analyzed by the system 40 when interpreting the "watch" rules. This greatly improves the efficiency and durability of the system to detect particular mail pieces.

Attributes about the each mail piece image 15 are extracted in near real-time by the system 40 and filtered through the "watch" rules 44 in real-time to determine further interest in the image. The evaluation system 40 does not affect the normal mail sorting functions. Attribute Extraction runs in near real-time to keep the amount of time that a physical piece dwells in the system to a minimum. Extracted image attributes serve as clues that can then be recorded in the database 32 and input to a set of rules.

The attribute extraction system 40 is connected to the image capture system 20 and the database system 30, via a dedicated LAN. Near real time attribute extraction processing can be scaled to keep up with the mail volume throughput within any given facility.

As shown in FIG. 1, the attribute extraction system 40 is also connected to the MLOCR control network 50. ZIP and scheme information are employed to track and locate the physical piece. For example, if the piece is in the facility and a reader is utilized on the Sorter, "watch" pieces can be physically located by running the pocket/tray(s) containing the piece back through the sorter. The WATCH system, running in near real time can use the zip code and piece attributes to identify the physical piece. A count of the pieces that entered the pocket can be displayed allowing the mail handler to directly locate the piece. A display of the image of the target piece can be displayed to verify the correct selection.

The attribute extraction system 40 performs a variety of additional analysis on each image to produce "characteristics" that can be associated with the image. In addition to analysis, it interprets "watch" rules 44 to determine if the characteristics should cause warning flags to be set in the database 32. The "watch" rules 44 can be input by the inspector and downloaded to the system 40 via the LAN 50. "Watch" rules 44 also dictate whether or not the image will be kept or discarded. It is estimated that only a few thousand images per day in any given facility would be of sufficient interest to warrant additional analysis.

Figure 6:
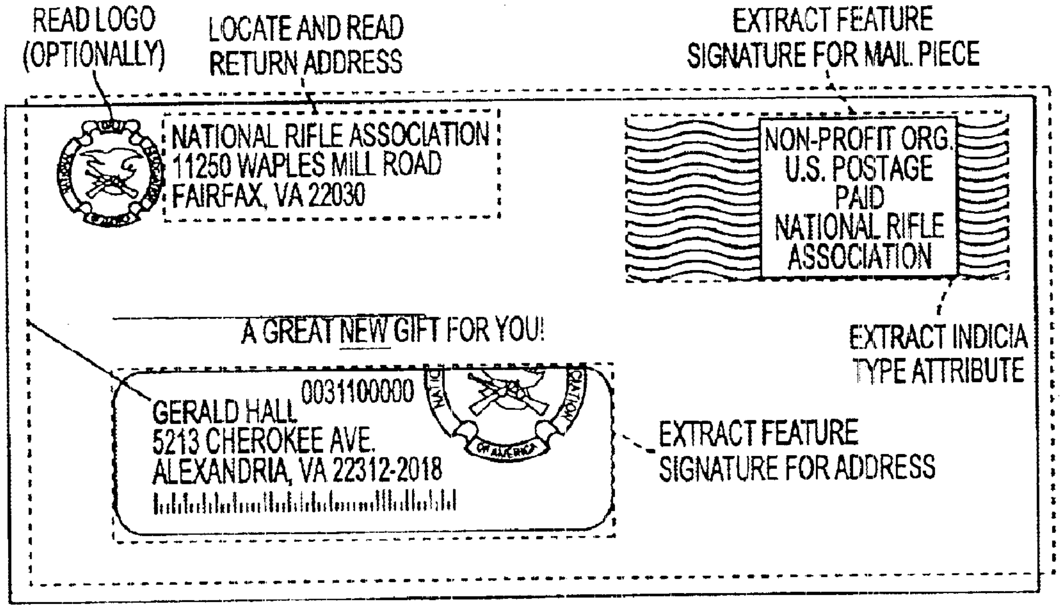
FIG. 6 is an illustration of the various mail piece characteristics which are captured and analyzed by the camera system and the image evaluation system of the present invention.

Attribute extraction employs Address Recognition and other pattern recognition techniques, such as COTS Graphology software packages, to determine attributes of each mail piece. Every address and every mail piece image can be reduced to a set of signature features (primitives) that describe the address and piece formation, as shown in FIG. 6. This set of features can be utilized to determine if the mode of address or piece formation matches a signature in a watch list of particular signatures. Both machine and handprint addresses can be graphically analyzed. In general, anything printed on the mail piece, including any piece of data, item of information, character or marking of any kind, or a region or group thereof, which appears on the mail piece can be captured and analyzed. Further, the entire mail piece can be captured and analyzed, or any desired region or regions of interest can be captured and analyzed.

All clues extracted by attribute extraction system 40 are recorded in the database 32 administered by the database software 34. Attributes generated by the system 40 include: fictitious return addresses; legitimate return addresses; firm names or LOGO in return address; individual names in return addresses; mail recipient names; mail recipient address; machine or handprint address flags; recipient address formation (graphology) signature; mail piece formation signature.

The attributes are also recorded in the database 32 where they can be queried for meeting certain conditions. For example, attribute extraction can locate, read and record each return address to determine if it is valid or missing. It can perform name recognition functions on mail recipients. It can extract feature signature codes from the addresses and also produce mail formation signatures. It can interpret "watch" rules designed by the user and Flag items that meet the rules. It can flag such pieces for human view or directly signal an ALARM to the sorter system. Scheme information can be employed to physically locate the mail piece within the sorter.

With an open architecture, the attribute extraction system 40 can be interfaced to other "black boxes" selected to extract proprietary attributes.

Some signature features that may be of interest in determining "watch" mail pieces include: destination/origination ZIP and/or person and/or address; originating mail center; time piece entered the system (and perhaps other time tags); envelope contrast; uniformity of the envelope background; handling steps of the mail piece up to this point (if possible, to create a more robust audit trail); presence of other "special" markings; payment type; payment amount; return address present/not present; size of mail piece; characteristics of the handprint/machine print including font style, writing implement type, size of characters, spacing of characters; presort level; and personality analysis of handwriting.

Figure 5:
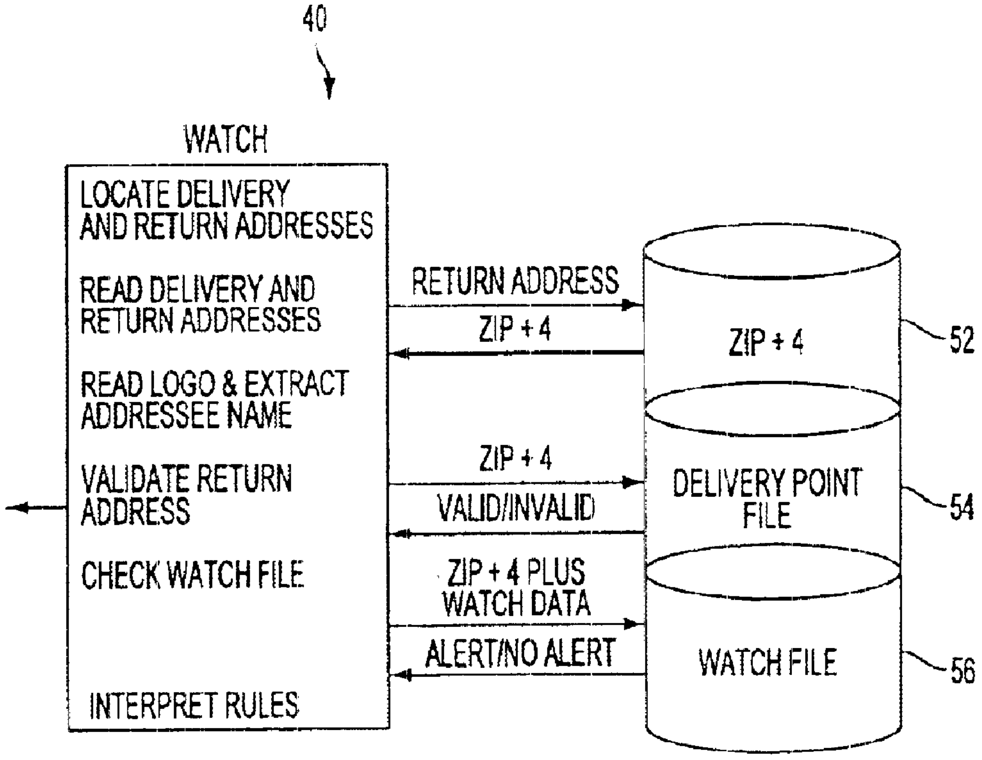
FIG. 5 is a schematic diagram of the process of the present invention.

As illustrated in FIG. 5, the attribute extraction system 40 utilizes the National ZIP+4 database 52 for address resolution and/or the DPV database 54 for delivery point validation. Normally, only return addresses will be resolved. In the event that the BC could be read, the recipient address will be resolved. Accordingly, when analyzing an image, the system 40 locate and read delivery and/or return addresses in the image and compare this information with information contained in the ZIP+4 database 52 and/or the DPV database to validate address information. If the delivery and/or return address information cannot be validated, the image can be flagged as a "watch" candidate. If validated, the system 40 can then compare and analyze this information with information stored in a watch database 56, which can include the "watch" rules 44 and known warning flags 46. The system 40 can also be attached to additional "Black Boxes" such as is currently done with FASTFORWARD for Recipient or Originator name matching. Other attributes from an image can be validated and/or analyze in this manner.

The foregoing specification describes only the preferred and alternate embodiments of the invention as shown. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed. In general, the present invention can be used in connection with any mail processing machine, or by itself, and can analyze any and all data or information appearing on each mail piece.

What is claimed is:

1. A system for evaluating mail pieces, comprising:

an image capture system for obtaining images of said mail pieces, said images comprising data appearing on corresponding said mail pieces;

a database system to receive and selectively store said data; and a recognition system for analyzing said data to determine whether said data includes pre-defined characteristics, wherein images having pre-defined characteristics which meet a minimum threshold are flagged for further analysis of the images.

2. The system of claim 1, wherein said recognition system compares said data to pre-defined mail piece watch information to determine whether said data matches said pre-defined mail watch information.

3. The system of claim 1, wherein said recognition system compares said data to pre-defined mail piece watch rules to determine whether said data meets said pre-defined mail watch rules.

4. The system of claim 1, wherein said pre-defined characteristics include at least one of the following:

existing address recognition;

fictional return addresses;

firm names in return address;

logos in return address;

individual names in return address;

mail recipient names;

mail recipient addresses;

machine address flags;

handprint address flags; and mail piece formation features.

5. The system of claim 1, wherein said recognition system analyzes images in real time.

6. The system of claim 1, wherein said recognition system analyzes images stored in said database system at a select time.

7. The system of claim 1, whereby said recognition system can interface with existing databases having mail piece images to analyze the images in said existing databases.

8. The system of claim 1, further comprising a tracking system for determining the physical location of the mail pieces.

9. The system of claim 1, wherein images having pre-defined characteristics which meet an elevated threshold are flagged for human analysis.

10. The system of claim 1, wherein images having pre-defined characteristics which meet an alarm threshold are flagged to triggering an alarm.

11. The system of claim 1, wherein the further analysis of the images does not affect processing of the mail pieces.

12. A method of evaluating mail pieces, comprising the steps of:

capturing images of said mail pieces, said images comprising data appearing on corresponding said mail pieces;

analyzing said data to determine whether said data includes pre-defined characteristics; and flagging images having a minimum threshold of said pre-defined characteristics for special processing of the images.

13. The method of claim 12, further comprising the step of storing said data in a database when the minimum threshold is reached.

14. The method of claim 12, wherein said step of analyzing includes the step of comparing said data to pre-defined mail piece watch information to determine whether said data matches said pre-defined mail watch information.

15. The method of claim 12, wherein said step of analyzing includes the step of comparing said data to pre-defined mail piece watch rules to determine whether said data meets said pre-defined mail watch rules.

16. A method of evaluating mail pieces in a mail processing machine, comprising the steps of:

capturing an image of a mail piece;

analyzing the image to determine whether the mail piece has any pre-defined characteristics;

processing the image according to at least one threshold level based upon the pre-defined characteristics.

17. The method of claim 16, wherein the image is further analyzed for any additional characteristics when the pre-defined characteristics of a mail piece meet a minimum threshold level.

18. The method of claim 17, wherein the image is routed for human analysis when at least one of the pre-defined characteristics and the additional characteristics of a mail piece meet an elevated threshold level.

19. The method of claim 17, wherein the mail piece is tracked to determine its physical location in the mail processing machine when at least one of the pre-defined characteristics and the additional characteristics of a mail piece meet an alarm threshold level.

* * * * *